United States Patent

[11] 3,599,839

[72] Inventor William A. Hansen
95 Ashland, Winnipeg 13, Manitoba, Canada
[21] Appl. No. 847,152
[22] Filed Aug. 4, 1969
[45] Patented Aug. 17, 1971

[54] VOLUMETRIC METER
6 Claims, 4 Drawing Figs.

[52] U.S. Cl. ................................................ 222/146 C, 222/250
[51] Int. Cl. ................................................. B67d 5/62
[50] Field of Search ........................................ 222/146, 146 H, 146 C, 249, 250

[56] References Cited

UNITED STATES PATENTS

| | | | |
|---|---|---|---|
| 507,316 | 10/1893 | Fowler | 222/250 |
| 1,003,256 | 9/1911 | Hardy | 222/250 |
| 3,439,835 | 4/1969 | Reid | 222/250 X |

FOREIGN PATENTS

| | | | |
|---|---|---|---|
| 832,115 | 4/1960 | Great Britain | 222/250 |

*Primary Examiner*—Robert B. Reeves
*Assistant Examiner*—Francis J. Bartuska
*Attorney*—Cushman, Darby & Cushman ABSTRACT: A volumetric meter is described which can be connected to a supply of liquid and is useful for dispensing predetermined quantities of the same. This liquid can be a carbonated beverage such as a soft drink or beer, or the liquid can be tea, coffee, soup or other hot liquid. The present volumetric meter comprises, in a broad sense, a tubular cylinder having two open ends that are closed by an end cap and a head cap, respectively. An axially movable piston is mounted within this cylinder and preferably is in sealed engagement peripherally therewith. This piston divides the cylinder into two chambers. The head cap includes a stationary portion, and a movable portion positionable between a first and a second position. Each portion is provided with liquid conducting channels, of which certain channels are in alignment in each of said positions. Depending upon which channels are in alignment, one of the chambers is in communication with a supply of the liquid for filling, while the other chamber is brought into communication with a discharge outlet and is simultaneously emptied. In one form, the head cap is provided with a choke coil which serves to control the discharge flow of the liquid as it is being dispensed. Preferably, the present volumetric meter is provided with two concentric cylinders one within the other for defining an annular interspace therebetween. This interspace is connected by suitable conduit means to a supply of coolant or heating fluid, depending upon whether the liquid being dispensed is cold or hot. The supply of liquid is under pressure. This pressure serves as the driving force causing movement of the piston to either end of the cylinder to dispense the predetermined quantity or volume of liquid from the chamber ahead of it.

VOLUMETRIC METER

This invention relates to a meter for dispensing a predetermined quantity of hot or cold liquid, and in a particular embodiment thereof, the invention relates to a volumetric meter for dispensing predetermined quantities of draft beer or similar carbonated beverage.

There are a great many situations in which it is desirable to be able to dispense a predetermined quantity of liquid, for instance, in a beverage room or cocktail lounge of a hotel, at self-serve counters in a cafeteria, and airport lounge or in a train station, or at refreshment booths provided in football stadiums, hockey arenas and so on. In each of those situations it is commonly desirable to have apparatus capable of dispensing a glass, a cup or a mug full of the liquid refreshment in question, accurately and with ease of operation. It is well known that not all beverages can be dispensed using the same techniques and equipment. It will be recognized, for instance, that beverages such as carbonated soft drinks and in particular, beer and draft beer require accurate control over the temperature and pressure at which they are to be dispensed, virtually right up to the point where the beverage is being introduced into a customer's glass or mug. It is well known that dispensing apparatus for beverages under pressure and under fairly high carbonation must not allow too rapid a decrease in pressure when the beverage is being dispensed. This is so because excessive amounts of carbon dioxide can be released from the liquid, when the pressure is reduced rapidly, and this causes a condition of excessive foaming. In most instances, such a condition would not be entirely satisfactory to a customer.

Attempts have been made in the past to provide dispensing apparatus and meters which overcome many of the problems noted above. Such attempts, however have not been entirely successful. Some prior art meters operate on a time cycle, that is to say, a valve or tap is held open, frequently electrically, for a preselected period of time during which the liquid is dispensed. Such devices are, unfortunately, rather prone to failure on account of some of the delicate parts used therein and this results in dispensing quantities of liquid inaccurately and inconsistently. That situation is, of course, a serious problem in commercial establishments. To applicant's knowledge at present, there is not a volumetric meter on the market either in Canada or the United States which will, for instance, satisfactorily dispense predetermined quantities of draft beer. The lack of such a device and the unreliability of prior art electronic meters on the market have prompted continued research in this field. Accordingly, it should be recognized that the detailed description below will, at times be specifically concerned with problems and characteristics concerned with meters which are used for dispensing beer, and draft beer in particular. This should not and is not intended to be taken in any limiting sense, but rather, such description is indicative of only one particular embodiment of a volumetric meter of the type contemplated herein.

It is therefore an object of this invention to provide a meter for dispensing various types of liquid accurately and consistently. Such liquid can, for instance, be a carbonated or non-carbonated beverage. A preferred version of the meter embodied by the present invention provides means for maintaining the liquid being dispensed at a relatively cool or a relatively hot temperature, depending upon whether the liquid is actually intended to be cold or hot, respectively.

It is also an object of this invention to provide a meter which is easy to construct and easy to operate. A meter of the type contemplated herein operates on the basis of simple mechanical functions. Such operation tends to reduce areas of potential failure due to misalignment of parts, excessive wear of moving parts, or thermal distortions, all of which can give rise to erratic, unsatisfactory performance.

These and other objects and advantages of the present invention will become more apparent from a reading of the detailed description below. However, in a broad sense, the present invention provides a meter adapted to be connected to a supply of liquid for dispensing a predetermined quantity of the same through a discharge outlet, comprising; a tubular cylinder having two open ends; a piston slidably disposed within said cylinder and serving to separate the cylinder into a first chamber and a second chamber; an end cap for sealing one of the open ends of the cylinder and including conducting channel means which communicate with said first chamber to enable filling and emptying the same; and a head cap for sealing the other end of the cylinder, including a stationary body portion and a movable body portion connected to the latter, both body portions having liquid conducting channels therein; the movable body portion being positionable between a first position in which certain of said conducting channels are in alignment to enable filling one of said chambers and emptying the other chamber, and a second position in which others of said conducting channels are in alignment to enable filling said other chamber and emptying said one chamber; with the liquid dispensed from said one and other chambers through said discharge outlet being equal in volume to said predetermined quantity. Numerous modifications and refinements can be made to a volumetric meter of the kind contemplated within the spirit of this invention. For instance, two concentric cylinders can be used, which define an interspace therebetween. A hot or cold fluid can be passed through this interspace in order to keep the liquid being dispensed at a desired and optimum temperature. Moreover, the axially slidable piston can be made adjustable in size, thus enabling the volume of liquid being dispensed each time to be varied from one meter to another.

In a preferred embodiment of the invention, then, there is provided a volumetric meter adapted to be connected to a supply of liquid, for dispensing a predetermined volume of the same through a discharge outlet; the meter comprising; two concentric cylinders, each having two open ends and serving to define an interspace therebetween; a piston slidably disposed within the inner cylinder and serving to separate the same into a first chamber and a second chamber, with the free volume of each chamber, when full of liquid, being equal to said predetermined volume; an end cap for sealing corresponding ones of the open ends of said cylinders and including conducting channel means which communicate with said first chamber to enable filling and emptying the same; and a head cap for sealing the other ends of said cylinders, including a stationary portion and a movable portion connected to the latter, with both portions having liquid conducting channels therein; the movable portion being positionable between one position in which certain of said conducting channels are aligned to enable filling one of the chambers while emptying the other, and a second position in which others of said channels are aligned to enable filling said other chamber while emptying said one chamber, said meter further including conduit means communicating with said interspace for conducting one of a heating fluid and a coolant therethrough for maintaining the liquid being dispensed within a chosen temperature range, said predetermined volume of liquid being dispensed through the discharge outlet. In yet a further modification of a volumetric meter as contemplated herein choke means are provided in operative relation to the discharge faucet to control the flow of liquid being dispensed therefrom.

Reference should now be made to the accompanying illustrative drawings, in which.

Figure 1:
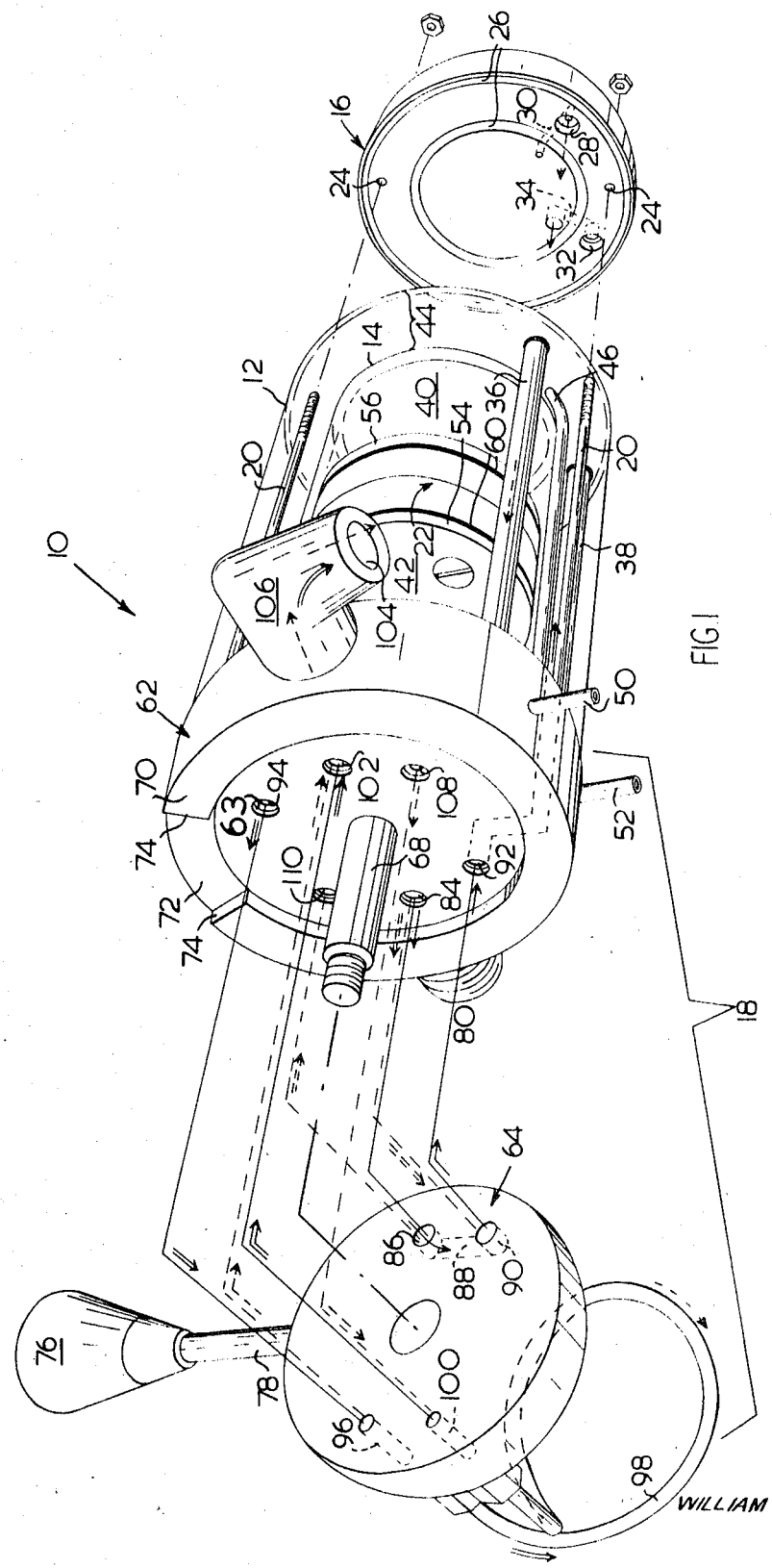
FIG. 1 is an exploded perspective view showing the primary features of a preferred embodiment of the type of volumetric meter contemplated herein.
Figure 2:
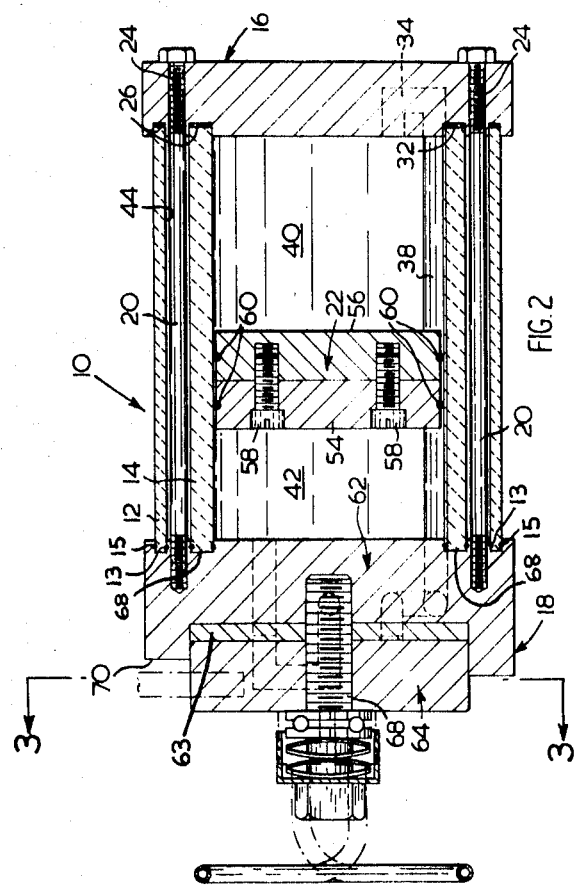
FIG. 2 is a side elevation view, taken in section along the longitudinal center line of the meter shown in FIG. 1.

Turning now to the drawings, and in particular to FIGS. 1 and 2, the numeral 10 designates the present volumetric meter overall. This meter 10 comprises two concentric cylinders, an outer cylinder 12 and an inner cylinder 14, each of which has two open ends. An end cap 16 and a head cap 18 are provided for closing each of the open ends of the cylinders 12 and 14. A pair of retaining screws 20 or similar fastening means are provided to lock the entire assembly securely together in a sealed relationship. A piston 22 is slidably disposed within the inner cylinder 14, and is movable axially relative thereto between a position in which the piston 22 is in contact with the head cap 18. As FIG. 2 shows, this movable piston 22 divides the inner cylinder 14 into two chambers, a rear chamber 40 bounded by the piston and end cap 16, and a forward chamber 42 bounded by the piston and head cap 18, the free volume of each chamber equaling the volume of liquid to be dispensed.

The end cap 16 is provided with apertures 24 extending therethrough for receiving the retaining screws 20. In addition, the interior face of the end cap 16 is provided with a pair of annular grooves 26 which are complimentary in configuration to receive one end of each of the outer and inner cylinders 12 and 14 to close and seal the same. These annular grooves can be provided with some rubber or elastomeric gasket and sealing material, since the end cap 16 will normally be made from stainless or other types of steel, whereas the cylinders 12 and 14 are usually made from precision glass tubing. Preferably, there are small grooves 13 provided adjacent the open ends of the cylinders 12 and 14, for O-ring seals 15. With these seals 15 to provide a fluidtight seal with the end and head caps 16 and 18, the axial "fit" of the cylinders in the grooves 26 can be more flexible It will be seen from FIGS. 1 and 2, that the apertures 24 are disposed between the concentric annular grooves 26, so that when the meter 10 is assembled, the retaining screws 20 are disposed in the annular interspace defined by the inner wall of cylinder 12 and the outer wall of cylinder 14. This annular interspace is indicated by the numeral 44. The end cap 16 is also provided with a discharge port 28 also located between the annular grooves 26, and a conducting channel 30 lying within the body of the end cap 16 in communication with the rear chamber 40. An inlet port 32 is also provided in the end cap 16, again being located between the annular grooves 26 and having associated therewith a conducting channel 34 which is in communication with the rear chamber 40. These ports and conducting channels can best be seen in FIG. 1.

Figure 3:
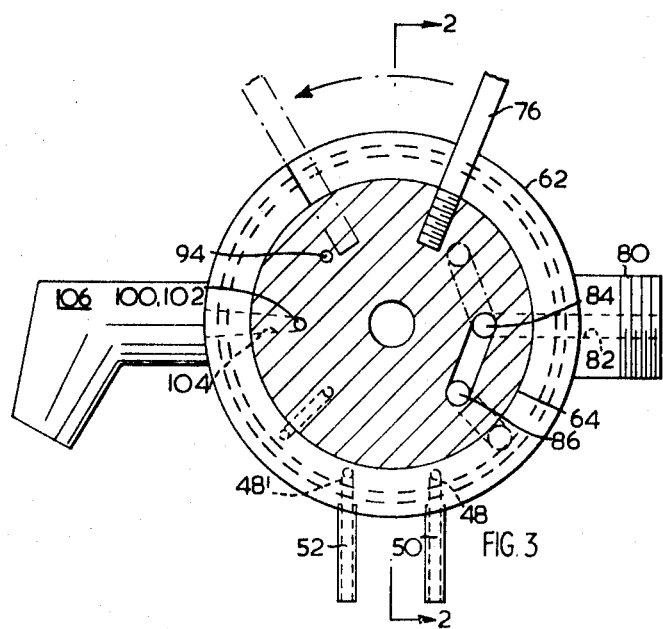
FIG. 3 is an end elevation view, taken in section along the line 3—3 of FIG. 2.

FIG. 1 also shows a pair of conduits 36 and 38 located in the interspace 44 between the cylinders 12 and 14, and being closely received within the ports 28 and 32, respectively. The conduit 36 can be considered as being a discharge line, while the conduit 38 can be considered as being a feed line. Both of these conduits are described in relation to flow of liquid in and out of the rear chamber 40. The annular interspace 44 has an inlet line 46 associated therewith which is in communication with an inlet channel 48 extending through the body of the head cap 18 (as seen in FIG. 3) and being connected to an inlet tube 50. A second channel 48' is also provided in the body of head cap 18, and is connected to an outlet tube 52. These tubes 50 and 52 are connected to suitable apparatus, not shown in the present drawings as this apparatus is conventional, for providing a supply of coolant, or hot water or other heating fluid. The coolant or heating fluid supplied by such apparatus can then be conducted into the annular interspace 44, either to maintain the liquid contained in the meter 10 within a selected temperature range, either cold or hot. To digress briefly, consider the following description in connection with a particular application of the present volumetric meter 10, dispensing draft or other types of beer and ale. As previously mentioned, the apparatus for cooling is known, per se, and therefore as complete description thereof need not be provided at this time. As it is known, a reservoir containing the coolant is placed in the beer cabinet or is perhaps attached to a heat exchanger directly ahead of the beer tap, and it derives its refrigeration from this heat exchanger or refrigerated atmosphere as the case may be. The coolant is then pumped continually into the annular interspace 44 in the volumetric meter 10, through the inlet line 46 which can be a small plastic supply tube, and back through the return outlet tube 52 to the cooling reservoir where it is recooled and made ready for reuse. An automatic float valve could be incorporated into this reservoir to maintain the coolant level. Alternatively, this function could be maintained manually. The fact that the beer in the volumetric meter 10 is at all times pressurized to the same pressure as in the supply keg, and maintained at a drawing temperature by means of the cooling chamber, i.e. the annular interspace 44 containing a refrigerant or cooling liquid, facilitates a perfectly stable drawing condition at all times. This stable drawing condition exists regardless of whether beer is dispensed repeatedly as from one glass to the next, or if a long period of time elapses before the next glass is drawn, for instance overnight. Accordingly, it matters not whether the particular glass of beer which has been drawn consists of beer which has sat in the volumetric meter 10 overnight, or came from the supply keg just moments previously. It will still be at a low temperature, preferably between 37° and 39° F. Thus, a glass of beer drawn at any time will be palatable to the customer.

Returning now to the drawings, it will be seen in FIG. 1 that the free end of the inlet line 46 is provided with a slight bend. This bend directs the incoming coolant or heating fluid in such a manner as to develop some swirl for uniformly distributing the fluid in the interspace 44. It should be noted, however, that other means can be provided both for introducing, and maintaining adequate swirling or turbulence of the fluid within the interspace 44.

As mentioned previously, the piston 22 is slidable within the inner cylinder 14. The piston 22 comprises two halves 54 and 56, which are secured together by means of fastening screws 58. If desirable, spacer means can be provided between the two halves 54 and 56 in order to adjust the axial dimension of the piston 22, thereby providing a capability for effecting variations in the maximum volume of each of the chambers 40 and 42. Axial adjustability of the piston 22 has a very real advantage. It will, for example, enable a minimum number of sizes of volumetric meters 10 to be manufactured, but still enables such meters to be used for dispensing a much larger variety of amounts of liquid. In other words, one basic size of volumetric meter 10 can be provided to enable dispensing different volumes, i.e., different sized cups, glasses or mugs, etc. of beverages such as hot soup, tea or coffee, a carbonated soft drink, or draft beer. Hence, the axial adjustability of the piston 22 contributes to the flexibility of the present volumetric meter 10 in relation to use thereof in dispensing a variety of different liquids.

Regardless of what liquid is being dispensed in the present volumetric meter 10, the piston 22 will be both axially slidable as well as being in peripheral engagement, preferably sealed, with the inner surface of the inner cylinder 14. In order to provide for this sealed engagement, a pair of O-ring seals 60 are provided, as shown in FIGS. 1 and 2. Other similar sealing or piston ring means could also be provided to give the same result. This sealing engagement is absolutely essential, since the supply of liquid is normally pressurized, as is the liquid in the meter 10 and any bypass around the piston would cause a steady leak at the discharge faucet. Moreover, the liquid is being dispensed to atmospheric pressure. As will be described further below, pressurized liquid from the source of supply and going into one chamber will effect discharging the contents from the other chamber, to a lower pressure. The inner cylinder 14 must be accurately formed to enable a sealed, but movable contact of the piston 22 therewith. Use of precision glass tubing having an inner diameter accurate to about ±0.001 inch has been successful. It should be pointed out, then, that in order to maintain maximum consistency in the volume of liquid dispensed from either of the chambers 40 and 42, virtually no leakage between such chambers should be allowed.

As will be evident especially from FIG. 1, the head cap 18 comprises three sections, a stationary part 62, a movable part 64 and a valve disc 63 between parts 62 and 64. The valve disc preferably is coated with Teflon, the DuPont trademark for tetrafluroethylene, and has rubber seals on the back face. This movable part 64 and valve disc 63 are connected to the stationary part 62 by means of a connecting spindle 66, the outer end of which is provided with a thrust bearing and a Belleville washer arrangement. The Belleville washer arrangement or an equivalent lock washer provides a biasing force for keeping the parts 62, 63 and 64 in close contact, while simultaneously allowing relative motion therebetween. The face of movable part 64 which mates with the valve disc 63 must be carefully machined, and preferably lapped to a mirror finish in order to be fluidtight, but still allow relative motion without excessive friction. O-ring seals are provided on the back face of valve disc 63 which mates with the outwardly facing and recessed surface of the stationary part 62. Also, depending upon the material of which the head and end caps 18 and 16 are made, the various ports and channels therein might be cast in place at the time of manufacture. This would facilitate providing as smooth a surface and edge as possible for these ports and channels, since avoiding any surface irregularities is desirable when handling carbonated beverages. The inwardly facing surface of the stationary part 62 is provided with concentric, annular grooves 68 which correspond in size and configuration to the grooves 26 in end cap 16. As with the end cap 16, the annular grooves 68 can be provided with some rubber or other elastomeric sealing material, since the entire head cap 18 will also normally be made from stainless or other types of steel, or brass. Again, O-ring seals are preferably provided on the cylinders 12 and 14 and hence axial fit of the same with grooves 68 can be flexible.

It is conceivable, however, that other materials such as some high strength plastics, for instance, might also be used for manufacturing the end and head caps 16 and 18. It will be recognized moreover that carbonated beverages are to be dispensed in some uses of the present volumetric meter 10, and such beverages are maintained under pressure in order to retain their carbonation. Hence, the meter 10 must be made from a material which has the necessary strength requirements, as will be recognized by those familiar with this art.

The outwardly facing surface of the stationary part 62 is provided with a raised rim portion 70 protruding axially of the meter 10, and having a cutout portion 72 at what, in use, would normally be the twelve o'clock position. This cutout portion 72 is delimited by shoulder tops or abutments 74. The shoulder stops or abutments 74 define an angle of approximately 45° with the apex of this angle being coincident with the longitudinal axis of the connecting spindle 66 and the volumetric meter 10. The raised rim portion 70 defines a central recess which is adapted to closely receive the movable part 64. An actuating handle 76 is mounted on the movable part 64 by means of a shaft 78 either by a threaded, a welded or other similar type of connection. Although not shown in the present drawings, a counter can be provided for recording the number of cycles through which the meter 10 has passed. This number ill be indicative of the volume of beverage which has been dispensed and can be used to correlate the revenues obtained against the volume of liquid dispensed. A counter of the type contemplated herein is well known in the art, and comprises a number of individual counter wheels having indicia thereon representative of units, tens, hundreds, and perhaps thousands digits. These individual wheels are generally mounted on a central spindle and have ratchet means associated therewith such that each wheel will be moved only after a predetermined number of actuations of the counter. In the present instance, the counter will be activated by contact of the shaft 78 or actuating handle 76 which engages a trip lever projecting from the counter.

The present volumetric meter 10 is adapted to be connected to a source of supply of the liquid to be dispensed, by means of an inlet pipe 80. The inlet pipe 80 is shown in FIG. 1 as being threaded in order to be connected directly to the supply of liquid, for instance, a keg or barrel of draft or other type of beer. FIGS. 1 and 2 show both the stationary and movable parts 62 and 64 of the head cap 18 as containing a number of conducting passageways. Some of these passageways are in alignment in one position of the movable part 64; while other passageways are in alignment in another position of the movable part, in order to selectively enable filling of one of the chambers 40 or 42. In the particular embodiment shown in the drawings, when the shaft 78 is in engagement abutting the rearmost shoulder stop 74, i.e. that shoulder stop closest to the inlet pipe 80, various passageways in the head cap 18 are in alignment to enable filling the rear chamber 40 while simultaneously enabling dispensing the contents of the forward chamber 42.

It is to be noted that for the convenience of the reader, FIG. 1 shows a single, solid arrow for the flow path of liquid being introduced into the rear chamber 40; while a solid double-stemmed arrow represents the flowpath of liquid being discharged from the forward chamber 42 simultaneously with the filling of chamber 40. Also for convenience only, a single dotted arrow represents the flowpath of liquid being discharged from the rear chamber 40; while a dotted, double-stemmed arrow represents the flowpath of liquid flowing into the forward chamber 42.

Accordingly, incoming fluid passes into the inlet pipe 80, from which it flows through an inlet channel having transverse and axial portions 82 and 84 in the stationary part 62 (FIGS. 1 and 3), then through an axial passageway 86, a transverse passageway 88 and another axial passageway 92 in the movable part 64. From here the incoming liquid is conducted into the feed tube 38. Since the feed tube 38 is in communication with the port 32 and channel 34 in the end cap 16, liquid passes therethrough and into the rear chamber 40.

The supply of liquid is normally maintained under pressure, and as will be recognized from the previous description, this same pressure will apply to the incoming liquid filling up one of the chambers 40 and 42. Since the piston 22 is movable from one position adjacent either the end cap 16 or the head cap 18 to another position adjacent the other of the head and end caps, filling of one of the chambers 40 or 42 requires the simultaneous evacuation or dispensing of contents from the other of such chambers.

Hence, as the rear chamber 40 is being filled, the contents in the forward chamber 42 will be dispensed. In so doing, the liquid passes from chamber 42 through a borehole 94 in the stationary part 62 and through a borehole 96 in the movable part 64 and hence into a choke coil 98. This choke coil is attached directly to the movable part 64 as indicated in FIGS. 1 and 2. Also, the choke coil 98 has a reduced internal diameter when compared to the diameter of others of the channels and passageways, in order to create a back pressure which can smoothly be reduced in the discharge faucet on the meter 10. The liquid being dispensed passes from the choke coil 98, through a borehole 100 extending axially through the movable part 64 and into an outlet port 102 in the stationary part 62 of head cap 18. This outlet port 102 communicates with an outlet channel 104 extending through the stationary part 62 generally transversely thereof and through a discharge faucet shown at 106.

Figure 4:
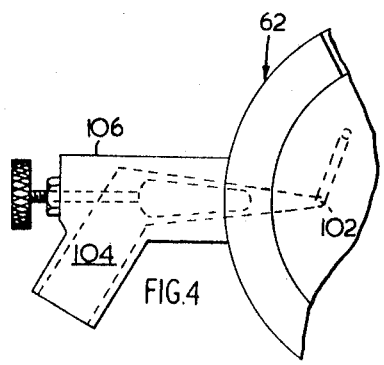
FIG. 4 is a fragmentary view showing one form of the discharge faucet on the meter of FIG. 3, and having a compensating feature built into such faucet.

The fragmentary view shown in FIG. 4 illustrates one particular form of discharge faucet 106; one containing a conical compensator element therein. In the case of using the present volumetric meter 10 for dispensing still, i.e. noncarbonated beverages, this compensating element probably would not be required at all. As previously indicated, it is preferable to use the choke coil 98 to replace the compensating element shown in the discharge faucet 106 of FIG. 4, as might further be explained as follows. Every beer tap has a compensating device included, or a choking device prior to the tap to offer some means of controlling the velocity and discharge pressure of the beer as it is being dispensed. As will be recognized in the art, beer is fairly highly carbonated and there are two main factors affecting retention of carbon dioxide. These are pressure and temperature. The ability of beer to retain carbon dioxide is directly proportional to increasing pressure and indirectly proportional to increasing temperature. Hence, as the temperature increases, carbon dioxide escapes from the liquid. Likewise, if the pressure under which the liquid is held were to be reduced, carbon dioxide would also again escape. It will readily be seen, therefore, that to maintain the beer in its original condition, it must be kept at a low temperature, preferably between 37° and 39° F., and at a fairly high pressure. It follows, then, that as the beer is allowed to dispense to atmosphere, if the pressure were decreased too rapidly or the liquid were allowed to be agitated considerably, a condition of excessive foaming due to escaping carbon dioxide will be created. Excessive foaming is of course undesirable insofar as dispensing a product which will immediately be satisfactory to consumers. It has been found that installation of the choke coil 98 a short distance back of the discharge faucet 106 will satisfactorily accommodate decreasing the pressure on the beer being dispensed and reduce foaming to a minimum. The choke coil 98 keeps the beer pressurized or "packed" up to that point. The beer or other similar carbonated beverage is then allowed to expand into the larger discharge faucet 106, gradually, and is dispensed in a stable condition. The choke coil 98 can be simply a tube of small diameter of any desired length. Depending upon the inside diameter, and the length of this tube, a given pressure drop is caused allowing the beer being dispensed to be reduced in pressure as well as in discharge velocity and swirl. It is desirable to reduce swirl within the discharge faucet 106 to a minimum, in order to reduce agitation as mentioned above, which causes excessive foaming due to escaping carbon dioxide.

Earlier description indicated what happens when the shaft 78 and actuating handle 76 on the movable part 64 are in the rearmost position, namely, rear chamber 40 is brought into communication with the incoming supply of liquid, while the forward chamber 42 is emptied of the contents thereof. It will now be seen that manipulation of the actuation handle to bring it to its forwardmost position, with shaft 78 in engagement with the forward abutment 74 will effect repositioning certain of the conducting channels in the movable part 64 to bring them into alignment with other channels in the stationary part 62. Movement of the actuating handle 76 to the forwardmost position will enable the content of rear chamber 40 to be dispensed while simultaneously allowing the forward chamber 42 to be replenished. With particular reference to FIG. 1, then, liquid flows from the rear chamber 40 through the transverse passageway 30 and outlet port 28 in end cap 16, and into the discharge tube 36. The liquid then passes through the discharge tube 36, through an axial bore hole or aperture 108, through the stationary part 62 and into the axial bore hole 100 in movable part 64, which had been repositioned y manipulation of the actuating handle 76. As previously noted, the axial bore hole 100 is in communication with the choke coil 98 through which the liquid being dispensed now passes, and subsequently out through the axial bore hole 96 and into outlet port 102 in the stationary part 62. From here, the liquid is then dispensed through the outlet channel 104 in discharge faucet 106.

With the discharge or dispensing of liquid from the rear chamber 40, replenishing of the forward chamber 42 takes place simultaneously, along the following flowpath. The incoming liquid passes into the inlet pipe 80 and out through the transverse and axial portions 82 and 84 of the inlet channel in head cap 18, and hence to the axial passageway 90. This axial passageway 90, in movable part 64, communicates with the transverse passageway 88 and enables the incoming liquid to pass through the axial passageway 86, now repositioned, and through an axial channel 110 extending through the stationary part 62 of head cap 18 and into the forward chamber 42.

It will be seen from the foregoing description that simple mechanical functions enable dispensing of liquid from either of the forward or rear chambers 42 and 40. Since any liquid contained in the volumetric meter is under the same pressure as the liquid in the source of supply, and the liquid is being dispensed to atmospheric conditions, that pressure will be the driving force which will effect a "pumping action" of the liquid from the meter 10. Simple manipulation of the actuating handle 76 to one of a forward or a rear position, from the other position will bring certain channels and passageways into alignment in the stationary and movable parts 62 and 64 of the head cap 18. Bringing the appropriate channels and passageways into alignment will enable incoming liquid to be directed selectively into one of the rear chamber 40 and forward chamber 42 and out of the other chamber. It will be evident that the mating faces of the stationary part 62, the TEFLON-coated disc valve 63, and 64 must be carefully machined and in a close fitting contact which is virtually fluid-tight Hence, the previously mentioned Belleville washer arrangement on the outer end of the connecting spindle 66 can be successfully utilized. Other equivalent arrangements can also be used, along with the possible provision of neoprene or other similar gasket and sealing material on the mating surfaces concerned, to prevent leakage of any liquid radially thereof.

It will be seen from the foregoing description that a volumetric meter of the type contemplated herein is simple in operation and construction, and is extremely flexible for use in a wide variety of applications. Many types of hot or cold liquid can be dispensed in predetermined amounts. Moreover, because a preferred embodiment involves the use of two concentric cylinders, such an embodiment provides a meter which enables very accurate temperature control of the liquid being dispensed right up to the point of dispensing. It will be recognized that such a preferred embodiment is particularly suitable for dispensing carbonated beverages, for the various reasons previously set forth. The description above has described a particular embodiment of a volumetric meter contemplated within the spirit of the present invention, and should be considered as being exemplary only. Several modifications have been suggested for a volumetric meter of the type contemplated herein and other obvious modifications will be apparent to those skilled in this art. All such modified versions of volumetric meters are intended to be comprehended within the scope of the present invention, as defined in the appended claims.

We claim:

1. A meter adapted to be connected to a supply of a pressurized carbonated liquid for dispensing an accurately measured quantity of such liquid through a discharge outlet, comprising:

a first and second tubular cylinder each having two open ends and being disposed to form an annular interspace therebetween;

a piston slidably disposed within the innermost cylinder in sealed engagement therewith and serving to divide said cylinder into a first chamber and a second chamber, the volume of each chamber swept out by the piston being equal to said accurately measured quantity;

an end cap having grooves provided on one face thereof for sealing one of the open ends of the cylinders, and including therein conducting channel means in communication with one of said chambers to enable filling and emptying the same of said liquid; and a head cap having means on one fact thereof for sealing the other ends of the cylinders, the head cap including a stationary body portion that engages the cylinders to seal said other ends, a movable body portion operatively coupled to said stationary body portion to be movable relative thereto, and valve disc means disposed between said body portions, both body portions and the valve disc means having liquid conducting channels therein; the movable body portion being positionable to a first position in which a first series of the conducting channels are in alignment to enable liquid flow through conduits interconnecting the end and head caps, and the channel means in the end cap for filling one of said chambers and simultaneously emptying the other chamber, and to a second position in which a second series of said conducting channels are in alignment to enable liquid flow through the same and said interconnecting conduits and end cap channel means for filling said other chamber while simultaneously emptying said one of the chambers, the accurately measured quantity of liquid thereby being dispensed through said discharge outlet.

2. The meter of claim 1, wherein said annular interspace is adapted to be coupled to a supply of refrigerant whereby the latter can be circulated through the interspace to maintain the pressurized carbonated liquid in the innermost cylinder within an accurately controlled temperature range, effectively up to the time the liquid is dispensed through said discharge outlet.

3. A volumetric meter adapted to be connected to a pressurized supply of a carbonated liquid for dispensing an accurately measured volume of the same through a discharge outlet, the meter comprising:

two concentric cylinders each having two open ends disposed to define an interspace therebetween;

a piston slidably disposed within and in sealed engagement with the inner cylinder, the piston serving to divide said cylinder into a first chamber and a second chamber, the swept volume of each chamber being equal to said accurately measured volume, said piston being movable by the pressure under which said supply of liquid is maintained;

an end cap having means on one face thereof for sealing one set of adjacent ones of the open ends of said cylinders, the end cap being provided with liquid conducting channel means in flow communication with the first of said chambers to enable filling and emptying the same; and a head cap having means thereon for sealing the other open ends of the cylinders, the head cap including a stationary first part that is in engagement with said other ends of the cylinders, a movable second part operatively connected to the first part, and a valve disc disposed intermediate said first and second parts; the valve disc being suitably apertured and each of said parts being provided with flow conducting channels therein, the second part having an operating handle thereon to move the same to first one and then the other of two positions in which liquid can be dispensed, on one of said positions a first set of said flow conducting channels having been brought into alignment for enabling flow of said liquid therethrough, through conduit means interconnecting the channels and channel means in said caps, and said channel means to fill one of said chambers while simultaneously draining the other chamber by dispensing one charge of the accurately measured volume of liquid, and in the other of said positions another set of said channels and channel means having been brought into alignment for similarly enabling flow of liquid therethrough and through the conduit means and caps to fill the other of said chambers while simultaneously draining the first chamber by dispensing another accurately measured charge of said liquid therefrom.

4. The volumetric meter of claim 3, wherein flow constricting means independent of the discharge outlet are provided in operative relation to said head cap, for creating a back pressure to control the discharge flow of liquid being dispensed through said outlet.

5. The volumetric meter of claim 4, wherein said interspace between the two cylinders is connectable to a source of refrigerant for circulating the latter therethrough, the refrigerant serving to maintain the liquid within a relatively accurately controlled temperature range effectively up to the discharge outlet.

6. The volumetric meter of claim 5, wherein said liquid is beer and the temperature range is 35° F. to 40° F.